Feb. 4, 1958  R. L. LICH  2,821,940
RAILWAY VEHICLE TRUCK
Filed Dec. 31, 1954  2 Sheets-Sheet 1
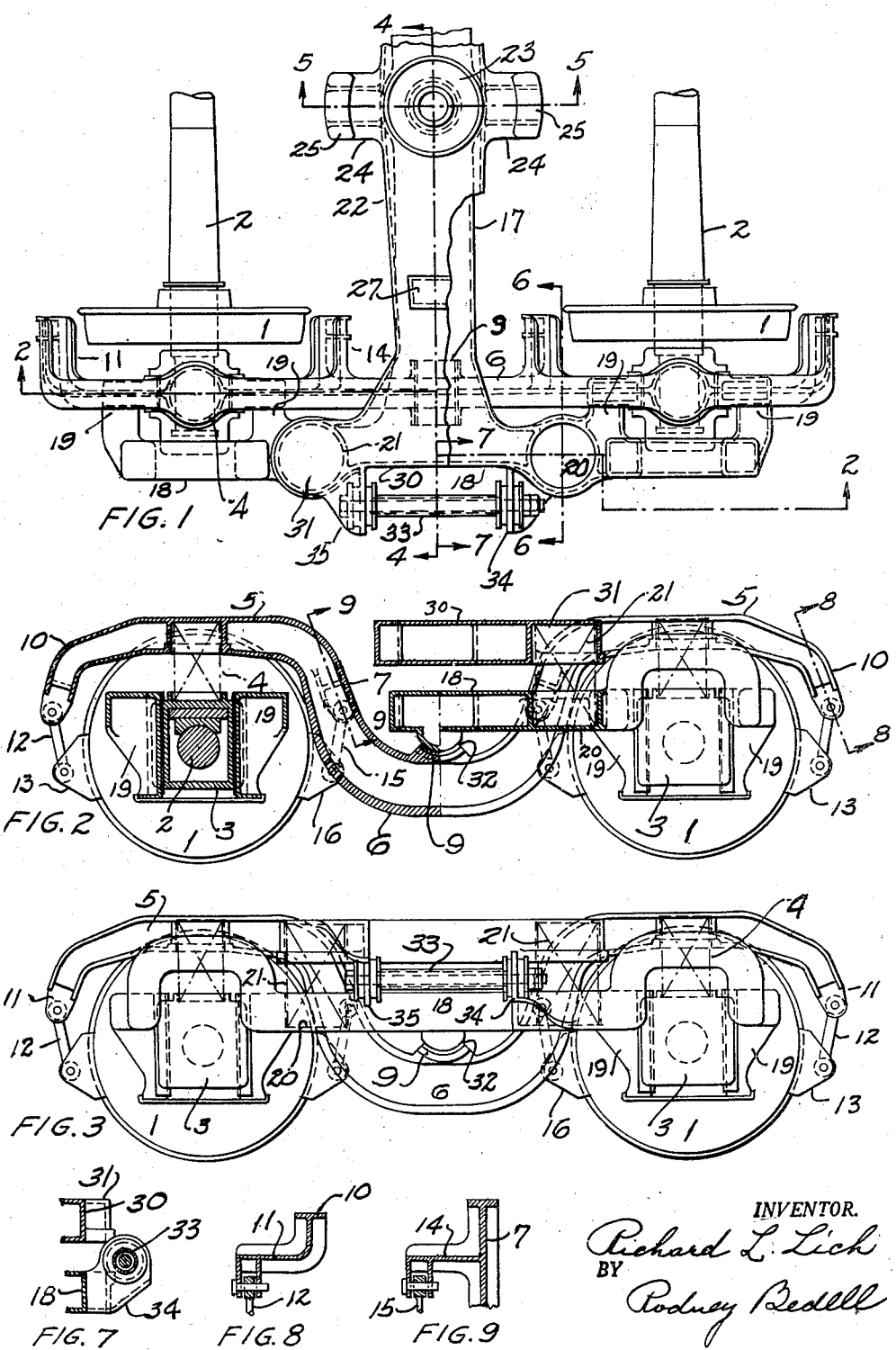
INVENTOR.
Richard L. Lich
BY
Rodney Bedell

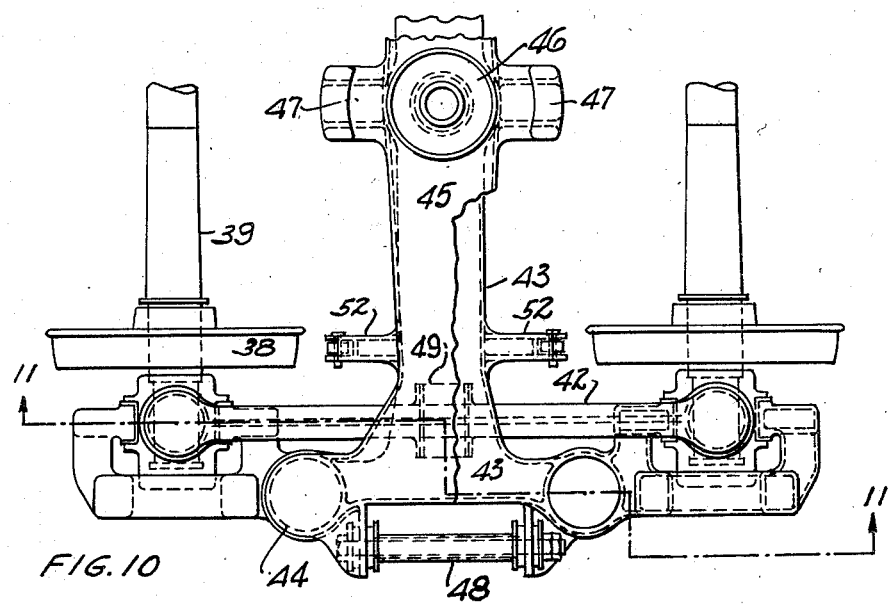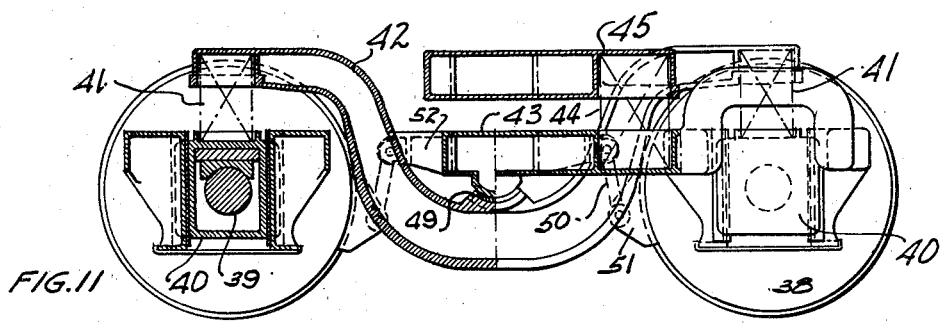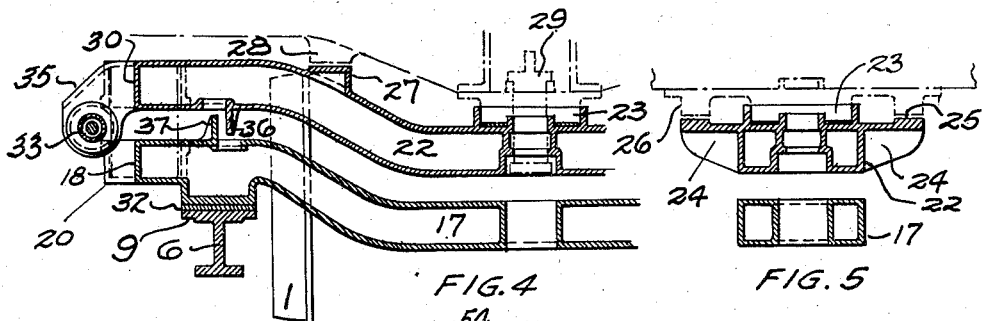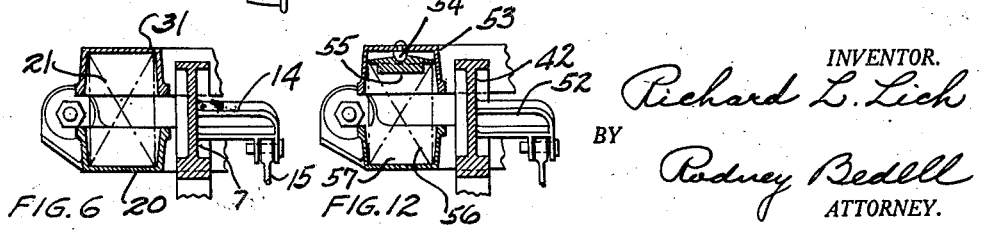

United States Patent Office 2,821,940
Patented Feb. 4, 1958

2,821,940

RAILWAY VEHICLE TRUCK

Richard L. Lich, St. Louis, Mo., assignor to General Steel Castings Corporation, Granite City, Ill., a corporation of Delaware Application December 31, 1954, Serial No. 479,188

17 Claims. (Cl. 105—182)

The invention relates to railway rolling stock and more particularly to a simple two axle truck having a double spring system.

The main objects of the invention are to produce a short wheel base truck with minimum unsprung weight and provided with a complete equalizing arrangement tending to distribute the loads and shocks equally to each wheel at all times. The equalization of the load to the wheels is accomplished by pivotally supporting the truck frame on the equalizers at the center of the equalizers.

An additional object of the invention is to obtain stability against undue tilting of the bolster transversely and longitudinally of the truck.

Another object of the invention is to provide for spring supporting mechanism from the journal boxes. This is accomplished by providing a spring-supported equalizer and brake hanger brackets on either the equalizer or the truck frame.

In the accompanying drawings illustrating selected embodiments of the invention, Figure 1 is a top view of one longitudinal half of a truck, a portion of the truck bolster being broken away to better illustrate the construction.

Figure 2 is in part a side elevation and in part a longitudinal vertical section of the truck shown in Figure 1 and is taken on the line 2—2 of Figure 1.

Figure 3 is a full side elevation of the truck shown in Figure 1 and shows a longitudinally extending anchor device between the truck frame and bolster.

Figure 4 is a transverse vertical section taken on the line 4—4 of Figure 1.

Figure 5 is a detail vertical longitudinal section taken on the line 5—5 of Figure 1.

Figure 6 is a detail transverse vertical section taken on the line 6—6 of Figure 1.

Figure 7 is a detail transverse vertical section taken on the line 7—7 of Figure 1.

Figure 8 is a detail transverse section taken on the line 8—8 of Figure 2.

Figure 9 is a detail transverse section taken on the line 9—9 of Figure 2.

Figure 10 is a top view of one longitudinal half of a truck similar to the truck shown in Figure 1 but of another form, a portion of the truck bolster being broken away to better illustrate the construction.

Figure 11 is a side elevation and longitudinal vertical section of the truck shown in Figure 10 and is taken on the line 11—11 of Figure 10.

Figure 12 is a section similar to Figure 6 but showing another form of the bolster spring support.

Figures 1-9 show a two axle truck with the usual wheels 1, axles 2, and journal boxes 3. Seated on each journal box is an upright coil spring 4. A drop equalizer extends between springs 4 at each side of the truck and has elevated end portions 5 resting upon the springs, a low level intermediate portion 6, and nearly upright portions 7 connecting portions 5 and 6. The equalizers are generally of I-shaped cross section but have inverted cup section terminals above the journal boxes to receive the upper ends of the coil springs 4. The elevated end portions 5 of the equalizers include outward extensions 10 provided with brake hanger brackets 11 for supporting brake hangers 12 and wheel tread-engaging heads and shoes 13. The upright portions 7 are provided with brake hanger brackets 14 for supporting brake hangers 15 and wheel tread-engaging brake heads and shoes 16.

The low level portion 6 of each equalizer is provided with an upwardly facing arcuate bearing 9. The truck frame is mounted solely upon bearings 9 and includes a central portion 17 extending transversely of the truck and wheel pieces or side members 18 at each end of central portion 17 and extending lengthwise of the truck with inwardly and downwardly projecting pedestal legs 19 at each end spaced apart to slidably receive a journal box 3 between them. Each side member includes upwardly facing spring seats 20 positioned outwardly of the adjacent equalizer. Upright coil springs 21 are mounted in seats 20 for supporting the load-carrying bolster.

The truck bolster comprises a transverse body member 22 having a load-carrying center plate 23. Brackets 24 (Figures 1 and 5) extend from the sides of the bolster on each side of center plate 23 and are provided with stop pads 25 to engage elements 26 on the vehicle body to prevent undue tilting of the bolster in a vertical longitudinal plane. Side bearings 27 (Figures 1 and 4) on the bolster engage elements 28 on the car underframe to prevent undue lateral tilting of the bolster relative to the car body. A locking center pin 29 in dot-dash lines (Figure 4) prevents vertical separation of the car body and truck bolster. Bolster side members 30 are provided at the ends of the bolster transverse member 22 and are elongated lengthwise of the truck and terminate in downwardly facing spring caps 31 receiving the upper ends of springs 21.

The arrangement described provides for minimum unsprung weight of the truck parts. The load is applied to the center of the equalizer, thereby providing a complete equalizing arrangement which tends to distribute the loads and shocks equally to each wheel at all times. The longitudinally spaced stops on each side of the load-bearing center plate will prevent tilting of the bolster in a vertical longitudinal plane and these stops together with the wide spacing of the bolster springs in combination with the pivoted support of the truck frame on the equalizers avoids undue tilting that may be caused by acceleration forces between body and truck, by brake retardation forces, or by galloping action of the truck. Preferably bearing 9 has a metallic lining 32.

A well-known anchor device 33 has one of its ends connected to a bracket 34 on the truck frame and the other end to a bracket 35 on the bolster to hold the truck frame and bolster against relative movement lengthwise of the truck while accommodating their relative movements vertically and transversely of the truck. Transverse movement of the bolster relative to the truck frame is permitted by the lateral deflection of coil springs 21. A depending bracket 36 on each end portion of the bolster and an upright bracket 37 on each of the truck frame side members form stops limiting relative lateral movement of the truck frame and bolster during lateral deflection of the springs 21.

Figures 10 and 11 illustrate a truck similar to the truck shown in Figures 1 to 9 except it is arranged for a single tread-engaging brake for each wheel instead of a clasp brake for each wheel. The truck includes wheels 38, axles 39, journal boxes 40, journal box springs 41, equalizers 42, truck frame 43, bolster springs 44, and bolster 45 having a load-bearing center plate 46 and longitudinally spaced body-engaging stops 47 at the sides of the center plate. A longitudinal anchor 48 holds the truck frame and bolster against relative movement lengthwise of the truck while accommodating their relative movements laterally and transversely of the truck. The truck frame is mounted upon bearings 49 on the equalizers 42.

This truck arrangement provides for a single tread-engaging brake on each wheel in which the brake hangers 50 and brake heads and shoes 51 are hung from brackets 52 on each side of the transversely extending central member of the truck frame 43. The equalizers terminate above the journal boxes in inverted cup sections for receiving the upper ends of the springs 41 mounted on the journal boxes.

Figure 12 illustrates another arrangement of the bolster supporting springs and provides a coil spring receiving pocket 53 in the bolster with a pivot pin 54 therein which is received in a depression in a spring seat member 55 on top of the spring 56 mounted in the recess 57 in the truck frame. In this arrangement relative lateral movement of the truck bolster and truck frame is provided by pivotal action between the upper ends of the spring and the bolster and by some lateral deflection of the bolster spring during such movement. This increases to a considerable extent the lateral flexibility of the spring unit as compared to the arrangement shown in Figure 6 if it is desired to use a stiffer spring.

The structures described attain the objects previously mentioned and the details may be varied substantially without departing from the spirit of the invention. The exclusive use of the invention coming within the scope of the claims is contemplated.

What is claimed is:

1. In a railway vehicle two axle truck, wheels and journal boxes, an equalizer extending between and supported upon the boxes at each side of the truck, a truck frame, support means therefor upon each equalizer between the ends of the equalizer, and a load-carrying bolster yieldingly supported from each side of the truck frame at points spaced apart longitudinally of the truck and between each journal box and the support means for the frame on the equalizer.

2. In a railway vehicle two axle truck, wheels and journal boxes, an equalizer extending between and supported upon the boxes at each side of the truck, a truck frame having a single support of restricted area on each equalizer between the ends of the equalizer, and a bolster having a single central annular bearing and fore and aft of said frame support for mounting a vehicle body and having widened end portions supported from the sides of the truck frame solely at points spaced apart longitudinally of the truck a greater distance than the diameter of said bearing.

3. In a railway vehicle two axle truck, wheels and journal boxes, an equalizer extending between and yieldingly supported upon the boxes at each side of the truck, a truck frame having sides elongated lengthwise of the truck, support means therefor upon each equalizer between the ends of the equalizer, and a load-carrying bolster yieldingly supported from the truck frame at points on the latter spaced apart lengthwise of the truck, each point being positioned between a journal box and the yielding support means for the frame on the equalizer.

4. In a railway vehicle two axle truck, wheels and journal boxes, an equalizer extending between and supported upon the boxes at each side of the truck, a truck frame, a single pivot support on each equalizer for the truck frame, said pivot support being positioned between the ends of the equalizer, a load-carrying bolster carried by the truck frame at points spaced apart lengthwise of the truck and between said frame pivot support and the journal boxes, the supports of the equalizers on the journal boxes and the supports of the bolster on the truck frame comprising vertically yielding spring structures and the support of the truck frame upon each equalizer accommodating tilting of the frame and bolster in a vertical plane and extending longitudinally of the truck.

5. In a railway vehicle truck, spaced axles provided with wheels and journal boxes, a drop equalizer at each side of the truck with elevated end portions supported upon the corresponding boxes, a low level intermediate portion and downwardly extending portions between the end portions and intermediate portion, a bearing on the low level portion of each equalizer, a truck frame pivoted on said bearing to tilt in a vertical plane extending lengthwise of the truck, brackets on the truck frame outboard and alongside of the downwardly extending portions of the equalizers, springs seated on said brackets, and a load-carrying bolster mounted on said springs.

6. In a railway vehicle truck having wheeled axles with journal boxes and equalizers at each side of the car extending between and supported upon corresponding boxes, a bearing intermediate the ends of each equalizer, a truck frame pivoted on said bearing to tilt in a vertical plane longitudinally of the truck, springs mounted on the frame and spaced longitudinally of the truck from the frame pivot bearing, and a load-carrying bolster mounted on said springs.

7. In a railway truck, spaced axles provided with wheels and journal boxes, a drop equalizer at each side of the truck, spring-supported on said boxes, provided with a bearing intermediate its ends, a truck frame seated on said bearings with side members projecting therefrom outboard and lengthwise of the truck and terminating at each end in inwardly and downwardly projecting pedestal legs slidably receiving said boxes between them, springs seated on said frame side members outboard of said equalizers and pedestal legs, near the inner pedestal at each end of the frame, and a load-carrying bolster extending transversely of the truck with ends extending over and supported on said springs on the truck frame.

8. A railway truck according to claim 1 which includes an anchor device extending lengthwise of the truck and connected at its ends to the truck frame and bolster respectively and holding the same against relative movement lengthwise of the truck but yielding to accommodate their relative movement vertically and transversely of the truck.

9. In a railway vehicle two axle truck, wheels and journal boxes, an equalizer extending between and supported on the boxes at each side of the truck, a truck frame pivotally supported upon the equalizers at a single point intermediate the ends of each equalizer, and a load-carrying bolster yieldingly supported from each side of the truck frame.

10. A railway vehicle truck as described in claim 9 in which the bolster is provided with a load-bearing center plate and brackets extending outwardly from each side of the center plate longitudinally of the truck and forming stops adapted to be engaged by vehicle underframe structure to prevent tilting of the bolster in a vertical longitudinal plane.

11. In a railway truck as described in claim 9 in which the equalizers are spring supported on the journal boxes.

12. In a railway truck as described in claim 9 in which the truck frame is provided with brake hanger brackets to support wheel tread-engaging brake shoes.

13. In a railway truck of the class described in claim 9 in which the equalizers are spring supported on the journal boxes and the truck frame is provided with brake hanger brackets for wheel tread-engaging brake shoes.

14. In a railway vehicle truck of the class described in claim 9 in which the equalizers are provided with brake hanger brackets for supporting wheel tread-engaging brake shoes.

15. In a railway vehicle truck of the class described in claim 9 in which the equalizers are spring supported on the journal boxes and have portions extending toward the ends of the truck beyond the journal boxes, and brackets for supporting clasp brake hangers positioned outwardly and inwardly of the boxes.

16. In a railway vehicle truck of the class described in claim 9 in which the bolster supporting springs have a pivotal connection with the bolster to provide lateral movement of the bolster relative to the truck frame and reduce lateral deflection of the bolster springs during such movement.

17. In a railway vehicle two axle truck, wheels and journal boxes, an equalizer member extending between said boxes and spring-supported thereon at each side of the truck, a truck frame pivotally supported upon each of the equalizer members at a single point intermediate the ends of the equalizer member, a load-carrying bolster, bolster supporting springs mounted on each side of the truck frame and yielding laterally to accommodate relative lateral movement between the bolster and truck frame member, and an anchor device extending lengthwise of the truck and connected at its ends to the truck frame member and bolster respectively and holding the same against relative movement lengthwise of the truck but yielding to accommodate their relative movement laterally and transversely of the truck, there being brake hanger brackets on one of said members for supporting wheel tread-engaging brake shoes, there being a load-bearing center plate on said bolster, and a bracket extending outwardly of the bolster on each side of the center plate longitudinally of the truck and forming stops adapted to be engaged by vehicle underframe structure to prevent tilting of the bolster in a vertical longitudinal plane relative to the underframe.

References Cited in the file of this patent

UNITED STATES PATENTS

| | | |
|---|---|---|
| 718,580 | Player et al. | Jan. 13, 1903 |
| 2,592,714 | Krautheim | Apr. 15, 1952 |
| 2,652,001 | Travilla et al. | Sept. 15, 1953 |